Nov. 24, 1931.  B. A. OLSON  1,833,470

PANEL RIP SAW MECHANISM

Filed Aug. 8, 1929  3 Sheets-Sheet 1

INVENTOR
Berndt A. Olson
BY
Gilbright Arnold.
ATTORNEY

Nov. 24, 1931.  B. A. OLSON  1,833,470
PANEL RIP SAW MECHANISM
Filed Aug. 8, 1929  3 Sheets-Sheet 2
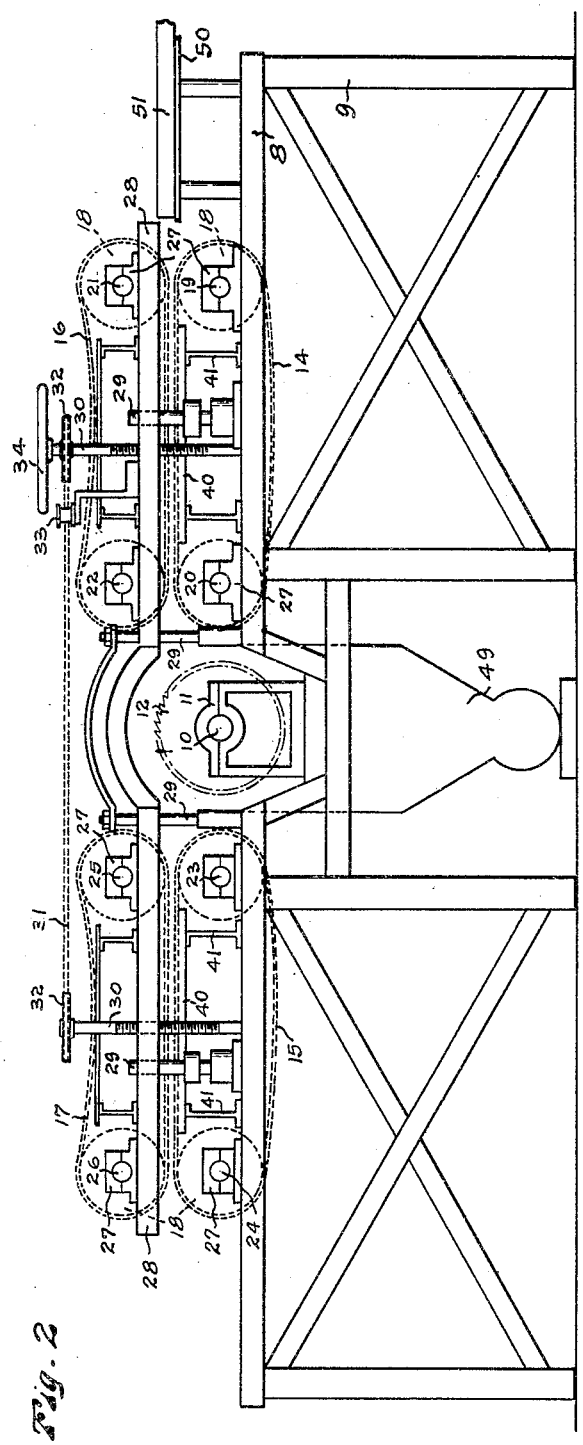
Berndt A. Olson
INVENTOR
BY Gilbright Arnold
ATTORNEY

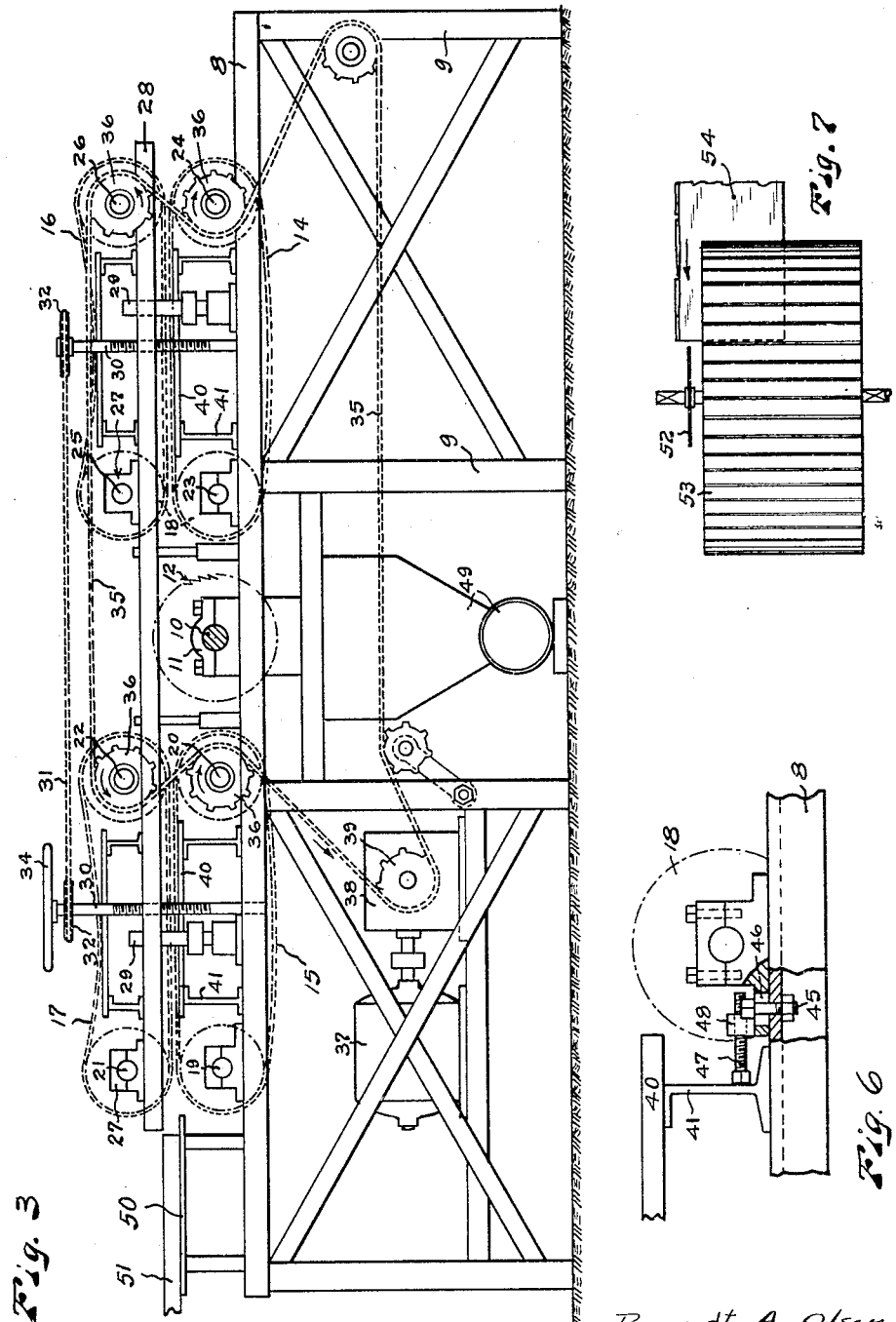

Patented Nov. 24, 1931

1,833,470

UNITED STATES PATENT OFFICE

BERNDT A. OLSON, OF TACOMA, WASHINGTON, ASSIGNOR TO TACOMA VENEER COMPANY, OF TACOMA, WASHINGTON, A CORPORATION OF WASHINGTON

PANEL RIP SAW MECHANISM

Application filed August 8, 1929. Serial No 384,298.

My invention relates to the art of panel rip saw mechanism. More particularly, my invention relates to a rip saw mechanism for a panel to provide the same with a saw cut disposed at a predetermined angle to the axis of said panel or to provide the same with two or more parallel cuts.

For purposes of definiteness and clearness of illustration, I will set forth my invention as applied to the art of plywood manufacture, but it is to be distinctly understood that it is not to be limited to any such specific use but is to extend to all fields embodying like problems and conditions either in whole or in part.

In the manufacture of plywood, all four edges of the panel come from the glue press with very irregular edges and one primary object of this invention is to provide the plywood panel with parallel sides or, in other words, to provide the panel with two or more saw cuts disposed at a predetermined angle to the axis of said plywood panel. Having provided the panel with parallel sides, it is then a comparatively easy matter to square off the ends so as to provide a panel of a true parallelogram form.

On sizes of panels such as are obtained in ordinary plywood manufacture process, since all the sides are uneven, it is impossible to employ lateral guide members in attempting to square the panels. It is therefore important to provide the panels of large dimensions with sides paralleling each other with a high degree of accuracy. The importance of this is more fully realized when it is noted that these large panels are generally cut up to form a large number of smaller panels or strips, and when these smaller panel pieces are to be of the size often required in the manufacture of automobile bodies, it is highly important that the sides be formed paralleling each other with great exactitude, because if the sides have a slight deviation from a true parallelism, when the large panel is divided up into the smaller strips, the last strip will reveal very decidedly the discrepancy. Furthermore, if there is a lack of parallelism when the panel is run through the trimming saw mechanism, the panel cannot be cut on a right angle to both sides. Obviously, therefore, it is important to provide the original panel with parallel sides. For this, the machine herein is designed especially. Having the two sides parallel, then the subdivision of the panel may be accomplished by other machines already in use. Furthermore, be it noted that the device embodying my invention is adapted to also carry said subdividing to sizes relatively much smaller than the original panel.

Heretofore, the common practice has been to employ a power driven roller mechanism as a holding means while the saw is cutting said panel. However, plywood is of an uneven thickness and portions thereof may be slightly warped from a true plane so that in being gripped by rollers, the axes of which are held in fixed parallelism to each other, there is a tendency for the panel to veer as the pressure of the rollers varies at different points across the panel. This veering effect thus produces lack of parallelism in the saw cuts.

In accordance with my invention, I provide endless moving belt means for gripping and holding a panel and for moving with said panel as said panel is advanced to the saws in a straight line, whereby one or more straight cuts may be made in the panel with very great accuracy. In the mechanism herein disclosed, a plurality of saws are provided whereby the edges of the panel may be formed straight and parallel, or whereby the panel may be cut into two or more pieces, all having accurately straight and parallel edges. The endless moving belt mechanism herein disclosed is in the form of caterpillar belts disposed in pairs on each side of the saws, each pair embodying a lower belt having its upper portion supported to prevent sagging and an upper belt of relatively heavy construction arranged to have its lower portion rest on a panel which is thus held relatively immovable between the two belts. The lower belt is provided with means for preventing sidewise movement and the panel is thus securely held and is moved to the saws in a straight line, whereby one or more straight saw cuts may be made in said panel. When the panel is inserted endwise between the two belts so that its greatest longitudinal dimension is parallel to the direction of movement of the belts, it may be cut to provide accurately parallel straight edges or may be split up into several panels, each having accurately parallel straight edges. If the panel is inserted at an angle between the two belts, then one or more straight cuts may be made in the panel at any desired angle to the axis of said panel.

The above mentioned general objects of my invention together with others inherent in the same, are attained by the mechanism illustrated in the following drawings, the same being preferred exemplary forms of embodiment of my invention, throughout which drawings like reference numerals indicate like parts:

Fig. 2 is an elevation on broken line 2—2 of Fig. 1, showing one side of the machine;

Fig. 3 is an elevation on broken line 3—3 of Fig. 1, showing the other side of the machine;

Fig. 4 is a fragmentary view on a larger scale, partly in section and partly in elevation, showing the ends of the caterpillar belts and showing the saws and bridge mechanism between the ends of said belts;

Fig. 5 is a fragmentary cross section on a larger scale showing the track means for supporting the upper portion of the lower belt;

Fig. 6 is a detached fragmentary view showing the tension adjusting means for the sprocket wheels which carry the endless moving caterpillar belts; and Fig. 7 is a fragmentary plan view illustrating a modification of the invention in which a saw is operatively disposed at the side of caterpillar belt feed means.

Figure 1:
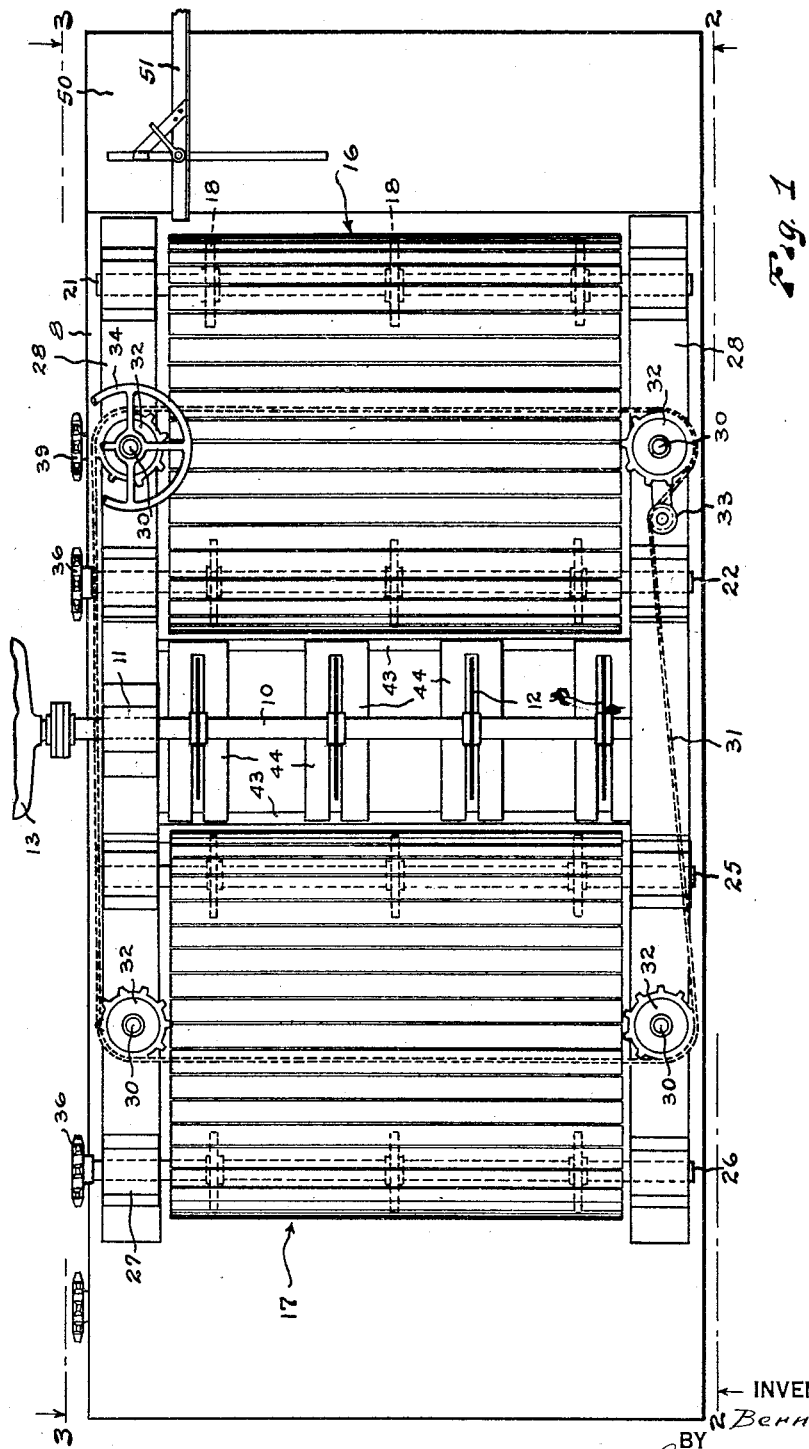
Figure 1 is a plan view of a panel rip saw embodying feed mechanism constructed in accordance with my invention.

Referring to the drawings, 8 designates a main frame which is mounted on legs 9 and serves as a support for the sawing and feeding mechanism.

The sawing mechanism comprises a transverse saw arbor 10 mounted in bearings 11 and having a plurality of circular saws 12 provided thereon. The saws 12 are preferably adjustable lengthwise of the arbor so that the width of the finished panels may be varied by varying the distance between the saws and so that certain saws may be moved to one side and not used. The arbor 10 is connected with a motor 13 by which it is driven.

The feeding mechanism comprises four endless caterpillar belts 14, 15, 16 and 17, shown by dotted lines in Figs. 2 and 3, and each formed of a plurality of transverse tread plates 56, (Fig. 4), secured to link belts 57, which run on sprocket wheels 18. The transverse tread plates 56 are preferably positioned relatively close to each other and are heavy enough to hold the panels of veneer or other material immovable between the belts as hereinafter explained.

The sprocket wheels 18 are mounted on shafts 19 to 26 inclusive, which are journaled in bearings 27. The bearings 27 of the lower shafts 19, 20, 23 and 24 are mounted on the main frame 8, and the bearings 27 of the upper shafts 21, 22, 25 and 26 are mounted on an upper frame 28, which is supported above the main frame and guided for vertical movement on vertical guide posts 29, and is arranged to be raised and lowered by four upright screw posts 30. The screw posts 30 are all connected together for simultaneous rotation by an endless link belt 31 shown in dotted line in Figs. 1, 2 and 3, which passes around sprocket wheels 32 on said screw posts. A tightener 33 is provided for the link belt 31 and a hand wheel 34 is provided on one of the screw posts 30 for turning all of said posts.

The vertically movable upper frame 28 thus carries the two upper belts 16 and 17, which are adjustable relative to the lower belts 14 and 15 to take care of panels of different thickness.

The belts 14, 15, 16 and 17 are all driven by an endless link belt 35 shown by dotted lines in Fig. 3, which passes over sprocket wheels 36 on the shafts 20, 22, 24 and 26. The link belt 35 is driven by a motor 37 which acts through suitable reduction gears, (not shown), within a housing 38 to drive a sprocket wheel 39. The link belt 35 drives all of the belts 14, 15, 16 and 17 at the same rate of speed and in such a manner that the adjacent or panel holding portions of said belts move in the same direction.

The upper portions of the lower belts 14 and 15 are supported in a horizontal plane in such a manner as to prevent sagging by track members 40, see Figs. 1, 4 and 5, which are carried on cross bars 41. One track member 40 is preferably provided under the upper portion of each lower link belt 14 and 15, and said link belts are provided with rollers 42 which roll on said track members. The side plates of the link belts preferably extend down over the sides of the track members 40, as shown in Fig. 5, so as to prevent sidewise displacement.

Two bridge supports 43 extend crosswise of the frame on each side of the saws and near the ends of the two sets of caterpillar belts and a slotted bridge plate 44, preferably of wood, extends crosswise between said supports 43 at the location of each saw. The bridge plates serve as means for supporting the panels between the two sets of holding belts.

The bearing 27 at one end of each of the caterpillar belts is preferably adjustable to afford means for taking up the slack in the belt. This may be done, as shown in Fig. 6, by securing the bearing to the frame by means of bolts 45 passing through slots 46 in either the bearing or the frame, and by providing a set screw 47 which is threaded into a lug 48 on the bearing and the head of which set screw abuts against the adjacent frame bar 41.

Suitable receptacle means 49 may be provided beneath the saws for the removal of the sawdust. A table 50 and an adjustable guide member 51 may be provided at the intake end of the machine to facilitate the feeding of panels thereinto.

In Fig. 6, I have shown an alternative form of the invention in which a saw 52 is positioned at the side of a pair of caterpillar belts 53 in such a manner that a panel 54, which is carried by said caterpillar belts, will have its edge removed by the saw.

In the operation of this invention, panels, which are to be trimmed up and provided with parallel edges, are fed in over the table 50 and are caught between the moving caterpillar belts 14 and 16 by which they are carried to the saws 12. The upper portion of the lower caterpillar belt 14 is supported horizontally and without sagging by the track members 40, thus forming a substantially level horizontal moving table on which the panel may rest. The lower portion of the upper caterpillar belt 16 is allowed to sag enough so that substantially its entire weight rests on the panel. The transverse bars 56 conform readily to irregularities in the shape of the panel and hold the panel firmly and relatively immovable between the two moving belts. The panel is thus securely held and is moving in a straight line when it encounters the saws. As soon as the front end of the panel has passed the saws, it is grasped and held between the two belts 15 and 17, and is thus supported from both ends during the greater portion of the sawing operation. The number and spacing of the saws on the arbor will determine the number and widths of the respective pieces into which the panel is cut. One or more of the saws 12 may be used, as desired.

The caterpillar belts hold the panels much more accurately than is possible with rolls or similar conventional devices which do not move with the panels, thus enabling the saw cuts to be made with much greater accuracy than would otherwise be possible.

Obviously, changes may be made in the forms, dimensions and arrangement of the parts of my invention without departing from the principle thereof, the above setting forth only preferred forms of embodiment.

I claim:—

1. A panel rip saw mechanism embodying a holding mechanism comprising a fixed track, a caterpillar member operatively disposed to move over and to be supported by said track and a caterpillar member of relatively heavy construction and of a length to provide for sagging, operatively disposed above and in such spaced relation with respect to the first caterpillar member that the weight of said sagging portion of said upper caterpillar member may be carried by the first caterpillar member for a portion of its circuit, said members moving in synchronism; a saw disposed in close proximity to one end of said holding mechanism whereby a plywood panel of non-uniform thickness may be provided with a saw cut disposed at a predetermined angle with respect to the axis of said panel; and a second holding mechanism longitudinally disposed and spaced apart from said first mentioned holding mechanism, the distance between said holding mechanisms being sufficient to facilitate the insertion and removal of said saw, whereby said panel is held by both of said holding mechanisms while being sawed excepting for the end portions thereof, whereby the positions of said holding mechanisms provide for the ready removal of the said saw.

2. In a panel rip saw mechanism, panel holding and feeding devices embodying a fixed track, a caterpillar member operatively disposed to move over and be supported on said track, another caterpillar member of relatively heavy construction and of a length to provide for sagging, operatively disposed above and in spaced relation relative to said first named caterpillar member, whereby the weight of said sagging portion of said last named caterpillar member may be carried by said first named caterpillar member for a portion of its circuit, means for moving the adjacent portions of said two caterpillar members in the same direction and at the same speed, saws disposed at one end of said holding mechanism whereby a plywood panel of non-uniform thickness may be cut to form accurately parallel edges, and a second holding mechanism longitudinally disposed and spaced apart from said first mentioned holding mechanism, the distance between said holding mechanisms being sufficient to facilitate the insertion and removal of said saws, whereby said panel is held by both of said holding mechanisms during the greater portion of the sawing operation, whereby the positions of said holding mechanisms provide for the ready removal of the said saws.

3. In lumber sawing apparatus, the combination with a rotary driven saw of means for feeding panels of material to said saw, said means embodying two sets of endless moving belts longitudinally spaced apart, the distance between said moving belts being sufficient to facilitate the insertion and removal of a rotary driven saw so that one set will push the material to the saw and the other set will draw the material from the saw whereby said saw may be readily removed, each of said sets of belts embodying two caterpillar belt members arranged one above another in slightly spaced apart parallel relation to receive therebetween the panel to be fed to the saws, the upper portion of each lower belt being supported to prevent sagging and the lower portion of each upper belt being free to sag and rest on the panel which is being fed to the saw, and means for driving all of said belts at the same speed and so that their panel engaging surfaces move in the same direction.

4. Feed mechanism for a panel rip saw embodying two sets of caterpillar belts longitudinally spaced apart, the distance between the caterpillar belts being sufficient to facilitate the insertion and removal of rotary driven saws, each set of belts embodying two endless moving belt members positioned one above the other in slightly spaced apart parallel relation so as to receive therebetween a panel to be sawed, the upper portions of the lower belts on which the panel rests being supported to prevent sagging and the lower portions of the upper belts being relatively heavy and being arranged to sag and rest on said panel to hold said panel immovable between said belts as it is fed to the saw, and rotary driven saws positioned between the adjacent ends of said two sets of caterpillar belts, whereby said saws may be readily removed.

5. Feed mechanism for a panel rip saw embodying two sets of caterpillar belts longitudinally spaced apart, the distance between the caterpillar belts being sufficient to facilitate the insertion and removal of rotary driven saws, each set of belts embodying two endless moving belt members disposed one above the other in slightly spaced apart parallel relation so as to receive therebetween a panel to be sawed, the lower belts on which the panel rests being supported to prevent sagging and the upper belts being relatively heavy and being arranged to sag and rest on the panel to hold said panel immovable between said belts as it is fed to the saws, rotary driven saws positioned between the adjacent ends of said two sets of caterpiller belts whereby said saws may be readily removed, bridge means associated with said saws and extending across the space between the ends of said two sets of belts, means for driving said belts at the same speed, and means for adjusting the upper belts vertically.

6. In a panel rip saw for making parallel cuts in panels, a main frame, rotary saws mounted crosswise of said main frame, two lower caterpillar belts mounted lengthwise of said main frame and longitudinally spaced apart on opposite sides of said saws with their ends adjacent said saws whereby said saws may be readily removed, tracks supporting the upper portions of said belts to prevent sagging, an upper frame supported above said main frame for vertical movement, means for adjusting said upper frame vertically, relatively heavy upper caterpillar belts operatively mounted on said upper frame and cooperating with said lower belts to receive therebetween the panels, the lower portions of said upper caterpillar belts sagging and resting on said panels to hold said panels relatively immovable between the moving belts, and a common non-frictional engaging means synchronously directly driving the upper and lower belts.

7. In a panel rip saw mechanism, two longitudinally spaced apart caterpillar holding mechanisms, the distance between said holding mechanisms being sufficient to facilitate the insertion and removal of a saw; and a saw positioned between said two holding mechanisms, whereby the positions of said holding mechanisms provide for the ready removal of said saw.

In witness whereof, I hereunto subscribe my name this 3 day of August, 1929.

BERNDT A. OLSON.